No. 883,781. PATENTED APR. 7, 1908.
C. J. T. BURCEY.
APPARATUS FOR MANUFACTURING CHARCOAL.
APPLICATION FILED MAR. 21, 1904.
3 SHEETS—SHEET 2.
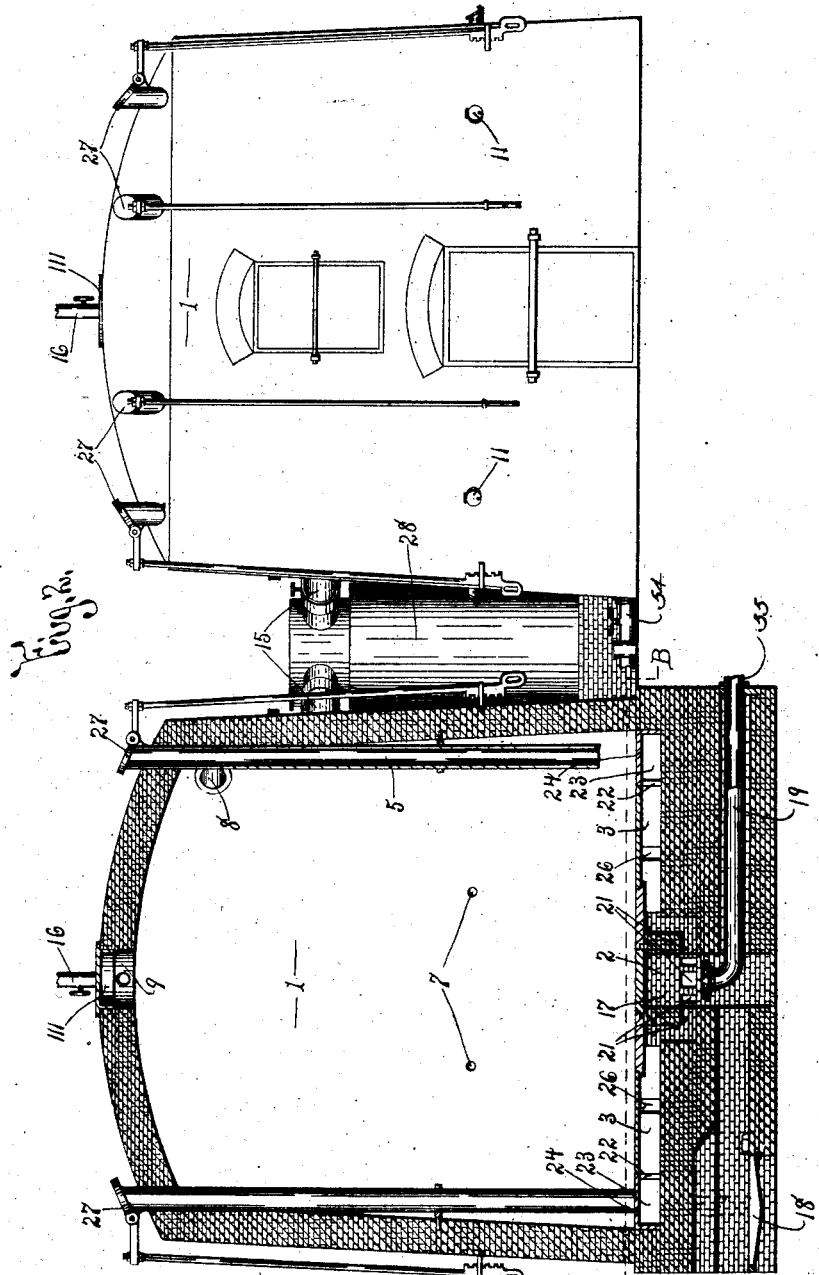
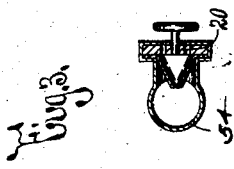
WITNESSES:
INVENTOR
BY
ATTORNEYS No. 883,781. PATENTED APR. 7, 1908.
C. J. T. BURCEY.
APPARATUS FOR MANUFACTURING CHARCOAL.
APPLICATION FILED MAR. 21, 1904.
3 SHEETS—SHEET 3.
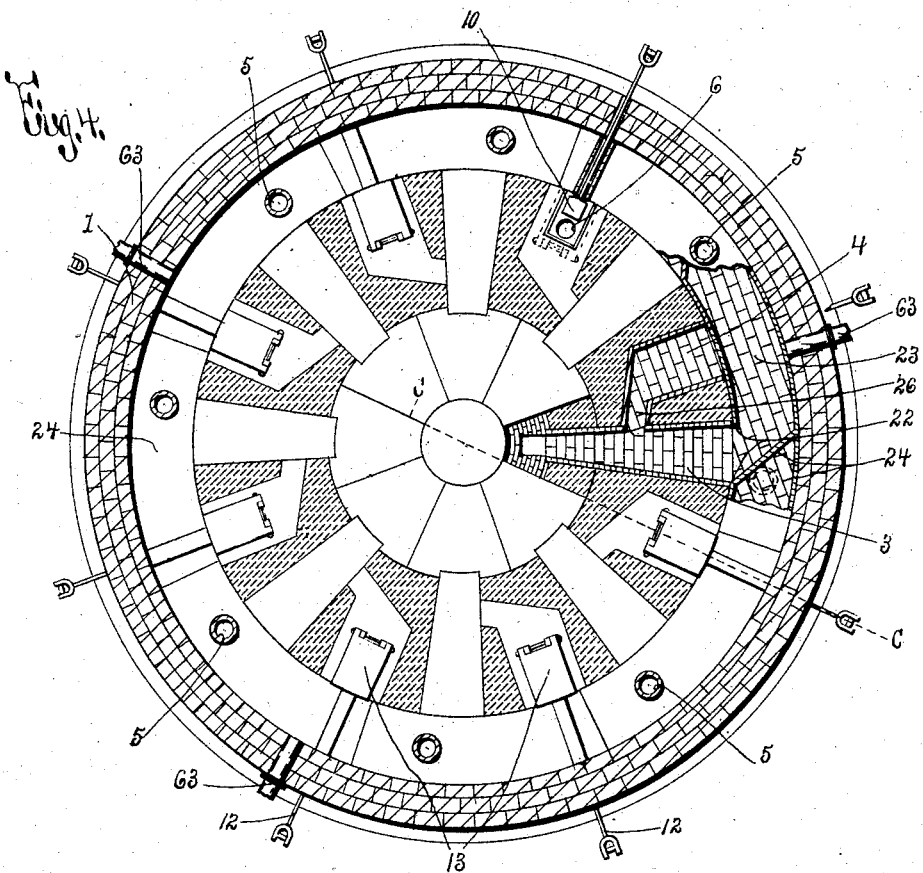
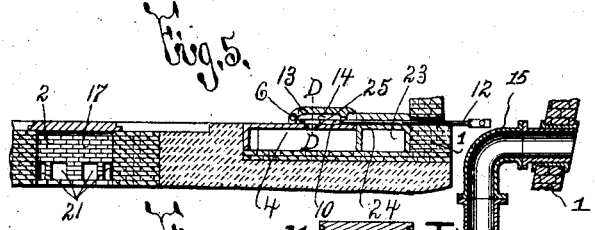
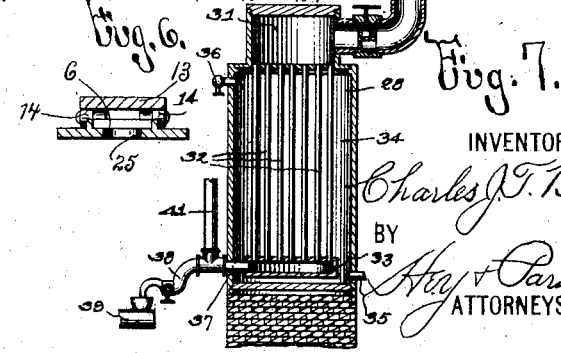
WITNESSES:
INVENTOR
Charles J. T. Burcey
BY
ATTORNEYS

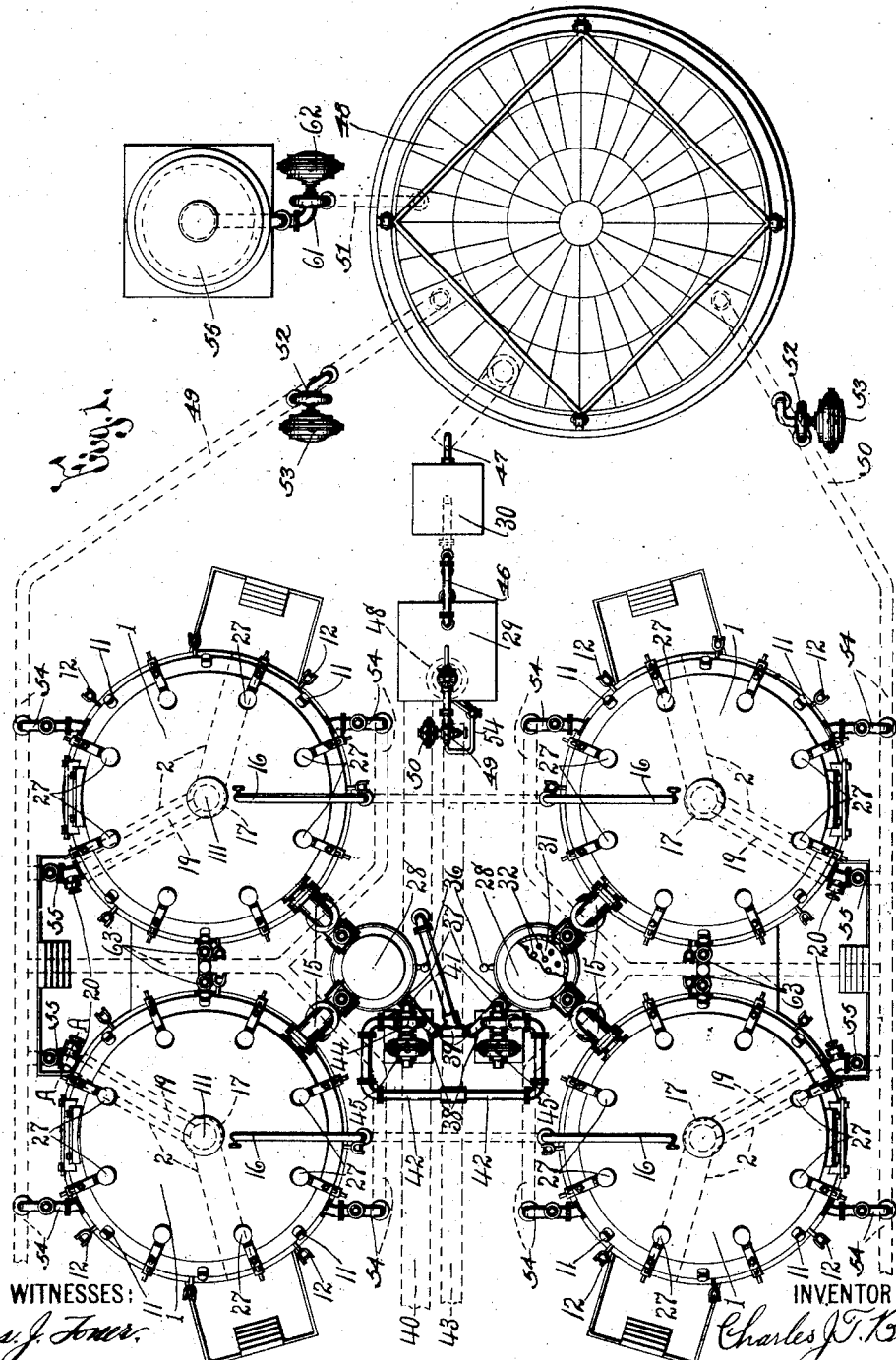

UNITED STATES PATENT OFFICE.

CHARLES J. T. BURCEY, OF SYRACUSE, NEW YORK, ASSIGNOR OF ONE-FOURTH TO FREDERICK R. HAZARD, OF SOLVAY, NEW YORK.

APPARATUS FOR MANUFACTURING CHARCOAL.

No. 883,781.  Specification of Letters Patent.  Patented April 7, 1908.

Application filed March 21, 1904. Serial No. 199,118.

*To all whom it may concern:*

Be it known that I, CHARLES J. T. BURCEY, of Syracuse, in the county of Onondaga and State of New York, have invented a certain new and useful Apparatus for Manufacturing Charcoal, of which the following is a specification.

My invention has for its object the production of an apparatus for distilling wood, which is simple in construction and highly efficient in use; and to this end, the invention consists in the combination, construction and arrangement of the component parts of an apparatus for the desired purpose, as hereinafter fully set forth and pointed out in the claims.

In describing this invention, reference is had to the accompanying drawings, forming part of this specification, in which like characters refer to corresponding parts in all the views.

Figure 1 is a top plan, partly broken away, of a preferable embodiment of my apparatus, a number of the conduits thereof being indicated by dotted lines. Fig. 2 is an elevation showing two of the ovens and contiguous parts of the apparatus, one of the ovens, for facilitating illustration of the construction thereof, having its inclosing shell in section, and being shown in a slightly different position relatively to the other oven than in Fig. 1. Fig. 3 is a detail sectional view taken on line A—A, Fig. 1. Fig. 4 is a horizontal sectional view, partly broken away, taken on line B—B, Fig. 2. Figs. 5 and 6 are vertical sectional views taken, respectively, on lines C—C and D—D, Figs 4 and 5. Fig. 7 is a vertical sectional view of the condenser.

The illustrated preferable embodiment of this apparatus comprises, essentially, one or more ovens for distilling wood, means for condensing and purifying the distilled gas, a gasometer for the gas, and means for supplying gas to the ovens. As here shown, each oven comprises a receptacle 1 for receiving the wood, a heating chamber 2, and passages 3, 4, 5. Each receptacle is preferably provided with openings 6, Figs. 4 and 5, arranged substantially equidistant from each other and leading downwardly in the bottoms thereof, openings 7, 8 and 9, Fig. 2, extending, respectively, through the walls and tops of the receptacles, and closures 10, 11, 111 for the openings 6, 7, 9 the closures 10, Figs. 4 and 5 being normally in operative position and being reciprocally movable into and out of operative position and provided with actuating rods 12 extending through the walls of the receptacles 1. Suitable caps 13 are arranged within the receptacles 1 above the openings 6 with their side edges raised above the underlying surfaces coincident with the tops of the openings 6 for forming openings 14, Figs. 5 and 6, at the sides of the caps to permit the flow of the gas from the openings 6 into the receptacles 1 when the closures 10 are in inoperative position, as shown in Fig. 5. Said caps 13 prevent the entrance of charcoal, or other articles, into the openings 6, and are usually pivoted at corresponding ends for facilitating access to said openings when desired. The openings 7 Fig. 2 permit inspection of the interiors of the receptacles 1, and the openings 8, 9 communicate, respectively, with conduits 15, 16 for conducting the gaseous products of distillation from said receptacles.

As best illustrated in Fig. 2, each heating chamber is formed with an upright centrally-arranged part 17 and oppositely-extending branches, one being provided with a grate 18, and the other containing a suitable gas-burner 19 having an air-inlet 20, Fig. 3. The passages 3 extend radially and substantially horizontally from the parts 17 of the heating chambers 2 and are provided with inlet-openings 21 in their inner ends and with exit-openings 22 in their outer ends which communicate, respectively, with separate compartments 23 of substantially ring-shaped hollow casings 24. The passages 4 Fig. 4 extend radially relatively to the heating chambers 3 and also substantially horizontally, alternate with the outer ends of the passages 3, and are provided with closed outer ends and with exit-openings 25 Fig. 5 in their tops communicating with the openings 6 of the receptacles 1 and preferably forming continuations of said openings 6. Suitable extensions 26 project laterally from the inner ends of the passages 4 and communicate, respectively, with the passages 3 intermediate of their ends. The passages 5 Fig. 4 communicate, respectively, with the compartments 23 of the casings 24, extend upwardly through the receptacles 1 and the tops thereof, and are provided with exit-openings discharging to the exterior of the receptacles, and with movable closures 27 for said exit-openings. These passages 5 are disconnected from the interiors of the receptacles by the inclosing shells thereof, and, consequently, the products of combustion escaping through the passages 5 are prevented from entering the interiors of the receptacles.

The means for condensing and purifying the distilled gas comprises condensers 28, a washer 29, and a filter 30. As best seen in Fig. 7, each condenser 28 comprises an upper chamber 31 connected to one of the conduits 15, substantially-upright passages 32 depending from the chamber 31, a lower chamber 33 communicating with the lower ends of the passages 32, and a substantially upright passage or chamber 34 which receives a cooling fluid, as running water, and is provided with an inlet and an outlet 35 36 for conducting the water to the base of the passage or chamber 34 and removing the same from the top thereof. Conduits 37 communicate with the chambers 33 and are each provided with a depending branch 38 discharging into a branch 39 of a conduit 40, and with an upwardly extending branch 41 communicating with a branch 42 of a gas-conduit 43. The flow of the gas through the branches 41 42 to the gas-conduit 43 may be accelerated by fans 44, driven by any desirable mechanism, as electric motors 45.

The washer 29 and filter 30 may be of any desirable form, size and construction and are connected by a conduit 46. The washer receives the gas from the conduit 43 and the filter delivers the same through a conduit 47 to a gasometer 48. The gasometer 48 Fig. 1 is also of any desirable form, size and construction, and is here illustrated, as connected to the conduit 55 and to additional conduits 49, 50 and 51, said additional conduits being here shown as each provided with a fan 52 which accelerates the flow therethrough and is driven by an electric motor 53. Said conduits 49 and 50 form means for supplying the gas from the gasometer to the ovens and are here illustrated as provided with branches 54 and 55 communicating, respectively, with the interiors of the receptacles 1 and the gas-burners 19. The conduit 51 may be connected to any suitable gas-generator 56, unnecessary to illustrate and describe herein in detail.

In the operation of my apparatus, the receptacles 1 are filled with wood, heat is generated in one or both of the branches of the chambers 2, the closures 10 Figs. 4, 5 are arranged in operative position, the caps 111 Fig. 2 are removed, the passage is closed through the conduits 15 16, the products of combustion escape through the passages 3, the compartments 23 and the passages 5 to the atmosphere, and the steam and gaseous products of distillation escape through the openings 9. After the distillation has continued for a predetermined time, the caps 111 are placed in position and the passage is opened through the conduits 15, whereupon the gaseous products of distillation escape from the receptacles 1 through the conduits 15 to the condensers 28, Fig. 1, and then pass through the conduit 37, branches 41 42, conduits 43, washer 29, conduit 46, filter 30 and conduit 47 to the gasometer 48. When the closures 10 are in operative position, the products of combustion are prevented from entering the receptacles 1, but after the air originally within the receptacles has been expelled, said closures may be opened, and more or less of the products of combustion thus admitted to the interiors of the receptacles for effecting rapid distillation of the wood. The arrangement of the passages 3, 4 and 5 and the casings 24 facilitates a uniform and particularly effective application of the heat to the wood to be distilled, and by means of the closures 10 and 27 the passage of the products of combustion for effecting such distillation may be regulated as desired to char the wood uniformly and rapidly, and inspection of the wood being charred is facilitated by the openings 7. The gas passed to the gasometer 48 is conducted by the conduits 49 and 50 and the branches 55 to the burners 19 for supplying the heat for charring the wood, and if the quantity of the gas produced from the wood being charred is insufficient, the generator 56 may be utilized to produce additional gas. Cooling of the charcoal after the distillation of the wood is preferably effected by opening the passage through the conduits 16 and the branches 54 and shutting off the passage through the conduits 15 and the entrance of the air to the interiors of the receptacles, whereupon the cooled gas flows from the gasometer through the conduits 49 and 50, the branches 54, the receptacles 1 and the conduits 16 to the conduit 43 and thence to the gasometer, and thus rapidly reduces the temperature of the charcoal without any liability of the combustion thereof.

The construction and operation of my invention will now be readily understood upon reference to the foregoing description and the accompanying drawing, and it will be apparent that more or less change may be made in the component parts thereof without departing from the spirit of my invention.

Having thus fully described my invention, what I claim as new and desire to secure by Letters Patent, is:—

1. The combination of an oven for distilling wood, said oven having a heating-chamber, a receptacle for the wood, passages communicating with the heating chamber and with the receptacle and constituting the sole means of the communication between the heating chamber and the receptacle, means for opening and closing said passages and means for withdrawing the gases freed from the charring wood from the wood receptacle.

2. The combination of an oven for distilling wood, said oven having a heating chamber, a receptacle for the wood, passages communicating with the heating chamber and with the receptacle and constituting the sole means of communication between the heating chamber and the receptacle, means for opening and closing said passages, means for withdrawing the gases freed from the charring wood, a gasometer for receiving such gases, a conduit for the gases connected to the withdrawing means and the gasometer, a conduit for conducting gas from the gasometer to the receptacle, and valves for controlling the flow of gas through the said conduits.

3. An oven for distilling wood comprising a heating chamber, a series of passages extending outwardly from the heating chamber, a second series of passages alternating with the first passages and each communicating with one of the first passages, conduits or chimneys communicating with said first passages and being disconnected from the second series of passages, and a receptacle for the wood arranged above the heating chamber, and said passages, substantially as and for the purpose described.

4. An oven for distilling wood comprising a heating chamber, a series of passages extending outwardly from the heating chamber, a second series of passages alternating with the first series of passages and each communicating with one of the first series of passages, and a conduit or chimney communicating with the first series of passages and being disconnected from the second series, a receptacle for the wood arranged above the heating chamber and said passages and means for connecting and disconnecting the wood receptacle from the second series of passages, substantially as and for the purpose set forth.

5. An oven for distilling wood comprising a heating chamber, a series of passages extending outwardly from the heating chamber, a second series of passages alternating with the former passages and each communicating with one of the former passages, a receptacle for the wood arranged above the heating chamber and said passages and having its interior normally disconnected therefrom, and means for connecting a plurality of the passages to the interior of the receptacle and thereby accelerating the distillation of the wood, substantially as and for the purpose set forth.

6. An oven for distilling wood comprising a heating chamber, a series of passages extending outwardly from the heating chamber, a second series of passages alternating with the former passages and each communicating with one of the former passages intermediate of its ends, a receptacle for the wood arranged above the heating chamber and said passages and having its interior normally disconnected therefrom, and means for connecting the second series of passages to the interior of the receptacle and thereby accelerating the distillation of the wood, substantially as and for the purpose described.

7. An oven for distilling wood comprising a receptacle for the wood, a heating chamber, a series of radial passages extending from the heating chamber and being normally disconnected from the interior of the receptacle, a second series of radial passages alternating with the outer ends of the former passages and each communicating with one of the former passages intermediate of its ends and having an exit-opening for communicating with the receptacle, and closures for the exit-openings, substantially as and for the purpose specified.

8. An oven for distilling wood comprising a receptacle for the wood, a heating chamber, passages extending outwardly from the heating chamber beneath the receptacle, some of the passages being disconnected from the interior of the receptacle and others having exit-openings in their tops for communicating with the receptacle, and closures for said exit-openings, substantially as and for the purpose described.

9. An oven for distilling wood comprising a receptacle for the wood, a heating chamber, a series of substantially horizontal radial passages extending from the heating chamber beneath the receptacle and having exit-openings in their outer ends, a second series of substantially horizontal radial passages alternating with the outer ends of the former passages and each communicating with one of the former passages intermediate of its ends and having an exit-opening in its top for communicating with the receptacle, and closures for the exit-openings communicating with the receptacle, substantially as and for the purpose specified.

10. An oven for distilling wood comprising a receptacle for the wood, a heating chamber, a series of substantially horizontal radial passages extending from the heating chamber beneath the receptacle and having inlet-openings in their inner ends communicating with the heating chamber and exit-openings in their outer ends, a second series of substantially horizontal radial passages alternating with the outer ends of the former passages and each having an exit-opening in its top for communicating with the receptacle and having its outer end closed and its inner end provided with a lateral extension communicating with one of the former passages intermediate of its ends, and closures for the exit-openings communicating with the receptacle, substantially as and for the purpose set forth.

11. An oven for distilling wood comprising a heating chamber, a receptacle for the wood arranged above the heating chamber and having its interior normally disconnected therefrom, passages communicating with the heating chamber and extending upwardly through the receptacle, said passages being disconnected from the interior of the receptacle and opening through the exterior of said receptacle, and means for connecting together the heating chamber and the interior of the receptacle and thereby accelerating the distillation of the wood, substantially as and for the purpose specified.

12. An oven for distilling wood comprising a heating chamber, a receptacle for the wood arranged above the heating chamber and having its interior normally disconnected therefrom, passages communicating with the heating chamber and extending upwardly through the receptacle, said passages being disconnected from the interior of the receptacle and opening through the top of the receptacle, and being provided with exit-openings discharging outside of said receptacle and with closures for the exit-openings, and means for connecting together the heating chamber and the interior of the receptacle and thereby accelerating the distillation of the wood, substantially as and for the purpose set forth.

13. An oven for distilling wood comprising a receptacle for the wood, a heating chamber, passages extending outwardly from the heating chamber, some of the passages being disconnected from the interior of the receptacle and others having exit-openings for communicating with the receptacle, closures for said exit-openings, and substantially upright passages communicating with the passages disconnected from the interior of the receptacle and being disconnected from said interior, substantially as and for the purpose set forth.

14. An oven for distilling wood comprising a receptacle for the wood, a heating chamber, a series of substantially horizontal radial passages extending from the heating chamber beneath the receptacle and having inlet-openings in their inner ends communicating with the heating chamber and exit-openings in their outer ends, a second series of substantially horizontal radial passages alternating with the outer ends of the former passages and each having an exit-opening in its top for communicating with the receptacle and having its outer end closed and its inner end provided with a lateral extension communicating with one of the former passages intermediate of its ends, closures for the exit-openings communicating with the receptacle, and substantially upright passages communicating with the first series of passages, and being disconnected from said interior of the receptacle, substantially as and for the purpose described.

15. An oven for distilling wood comprising a heating chamber, a series of passages extending outwardly from the heating chamber, a receptacle for the wood arranged above the heating chamber and said passages and having its interior normally disconnected therefrom, means for connecting together the passages and the interior of the receptacle and thereby accelerating the distillation of the wood, hollow casings connecting with the passages, and a second series of passages communicating with the casing and extending upwardly in the receptacle, said second series of passages being disconnected from the interior of the receptacle, substantially as and for the purpose specified.

16. An oven for distilling wood comprising a receptacle for the wood, a heating chamber, passages extending outwardly from the heating chamber, some of the passages being disconnected from the interior of the receptacle and others having exit-openings for communicating with the receptacle, means for closing the exit-openings, hollow casings connecting with some of the passages and having its interior disconnected from others of the passages, and a second series of passages communicating with the casing and extending upwardly in the receptacle, said second series of passages being disconnected from the interior of the receptacle, substantially as and for the purpose set forth.

17. An oven for distilling wood comprising a receptacle for the wood, a heating chamber, a series of substantially horizontal radial passages extending from the heating chamber beneath the receptacle and having inlet-openings in their inner ends communicating with the heating chamber and exit-openings in their outer ends, a second series of substantially horizontal radial passages alternating with the outer ends of the former passages and each having an exit-opening in its top for communicating with the receptacle and having its outer end closed and its inner end provided with a lateral extension communicating with one of the former passages intermediate of its ends, closures for the exit-openings communicating with the receptacle, hollow casings connecting with the exit-openings in the first series of passages, and a third series of passages communicating with the casing and extending upwardly in the receptacle, said third series of passages being disconnected from the interior of the receptacle, substantially as and for the purpose described.

18. An oven for distilling wood comprising a heating chamber, a series of passages extending outwardly from the heating chamber, a receptacle for the wood arranged above the heating chamber and said passages and having its interior normally disconnected therefrom, means for connecting together the passages and the interior of the receptacle and thereby accelerating the distillation of the wood, a substantially ring-shaped hollow casing having separate compartments communicating respectively with the passages, and a second series of passages communicating respectively with the compartments of the casing and extending upwardly into the receptacle, said second series of passages being disconnected from the interior of the receptacle, substantially as and for the purpose specified.

19. An oven for distilling wood comprising a receptacle for the wood, a heating chamber, a series of substantially horizontal radial passages extending from the heating chamber beneath the receptacle and having inlet-openings in their inner ends communicating with the heating chamber and exit-openings in their outer ends, a second series of substantially horizontal radial passages alternating with the outer ends of the former passages and each having an exit-opening in its top for communicating with the receptacle and having its outer end closed and its inner end provided with a lateral extension communicating with one of the former passages intermediate of its ends, closures for the exit-openings communicating with the receptacle, a substantially ring-shaped hollow casing having separate compartments communicating respectively with the first series of passages, and a third series of passages communicating respectively with the compartments of the casing and extending upwardly into the receptacle and discharging through the exterior of the receptacle, said third series of passages being disconnected from the interior of the receptacle, substantially as and for the purpose set forth.

In testimony whereof, I have hereunto signed my name in the presence of two attesting witnesses, at Syracuse, in the county of Onondaga, in the State of New York, this 19th day of March, 1904.

CHARLES J. T. BURCEY.

Witnesses:
   D. LAVINE,
   S. DAVIS.